Figure 1:
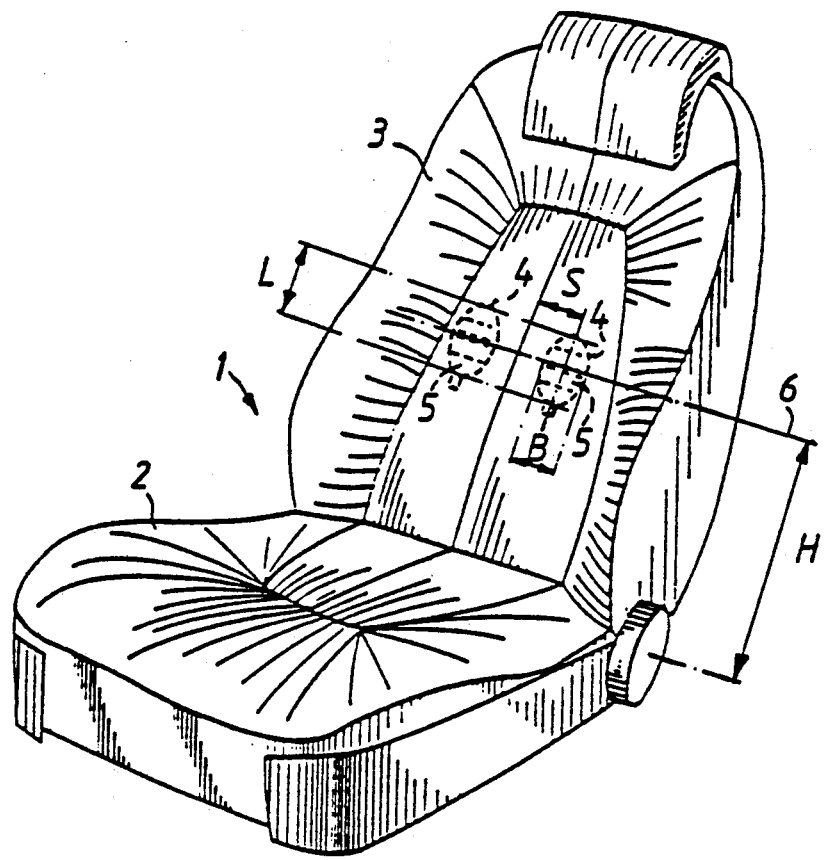

United States Patent [19]

Sperr

[11] Patent Number: 5,033,458
[45] Date of Patent: Jul. 23, 1991

[54] MASSAGING ARRANGEMENT FOR A SEAT BACKREST

[75] Inventor: Gustaf Sperr, Trollhättan, Sweden

[73] Assignee: Saab-Scania AB, Sweden

[21] Appl. No.: 469,490

[22] PCT Filed: Oct. 7, 1988

[86] PCT No.: PCT/SE88/00519
§ 371 Date: Apr. 12, 1990
§ 102(e) Date: Apr. 12, 1990

[87] PCT Pub. No.: WO89/03321
PCT Pub. Date: Apr. 20, 1989

[30] Foreign Application Priority Data
Oct. 14, 1987 [SE] Sweden .................... 8703989

[51] Int. Cl.⁵ .................... A61H 1/00; B60N 1/00
[52] U.S. Cl. .................... 128/33; 128/49; 128/52; 128/60
[58] Field of Search .............. 128/33, 48, 49, 51, 128/52, 61, 32, 60, 44

[56] References Cited

U.S. PATENT DOCUMENTS

| 799,881 | 9/1905 | Wells | 128/52 |
| 4,005,703 | 2/1977 | Rosen et al. | 128/33 |
| 4,101,816 | 7/1978 | Shepter | 318/130 |
| 4,748,972 | 7/1988 | Hasegawa | 128/24 A |

FOREIGN PATENT DOCUMENTS 3713370 2/1987 Fed. Rep. of Germany ........ 128/44

Primary Examiner—Edgar S. Burr
Assistant Examiner—Eric P. Raciti
Attorney, Agent, or Firm—Ostrolenk, Faber, Gerb & Soffen

[57] ABSTRACT

An arrangement for a seat intended to be fitted in the back-rest of the seat in order to massage the back of a person sitting in the seat. The arrangement comprises two identical pulsators (5) intended to be accommodated in recesses in the padding material of the seat. Each pulsator (5) comprises an electrical drying motor (11) for driving a number of massage elements (29-32). The driving motors (11) are connected to a common electrical control system which, during a time-limited work cycle, intermittently supplies the driving motors (11) with voltage.

21 Claims, 2 Drawing Sheets

MASSAGING ARRANGEMENT FOR A SEAT BACKREST

The present invention relates to an arrangement for a seat intended to be fitted in the back-rest of the seat in order to massage the back of a person sitting in the seat.

A person sitting in a seat activates certain groups of muscles, principally located in the back, in order to maintain an upright seated position. The muscle groups are then stressed primarily statically. After a greater or lesser period of time this muscle strain results in the muscles becoming tired and, in serious cases, also being subject to cramp. This leads to feelings of discomfort, which remain even after sitting has ended. These problems are especially troublesome for people who are forced by their work to remain seated for long periods of time, for example professional chauffeurs, and also people, for example those confined to wheelchairs, who are forced for other reasons to remain seated for long periods.

It is known per se that muscle cramps can be eased by means of massage. However, this is a method of treatment which, for practical reasons, is used only when the discomfort has reached a very painful stage. Massage is usually administered by hand, but mechanical arrangements also exist which attempt to simulate the treatment provided by a masseur. It is known, for example in U.S. Pat. Specification No. 4,422,448, to design a seat with a massage arrangement fitted in the back-rest. The massage arrangement is in this case made up of two rings, which are rotatably mounted on two eccentric discs. The discs are rotatable about a horizontal shaft. By means of a control system the distance between the discs can be adjusted, as can the vertical position of the shaft. It is thereby possible to control the area of the back which is to be massaged.

However, since the known massage arrangement has been designed so as to be able to massage a number of different muscle groups, the arrangement has proven complicated and, as a result of this, also expensive. The seat is primarily intended to be used in treatment establishments in order to replace manual massage.

In connection with seats for vehicles it is known, according to international Patent Specification WO 85/00029, to design the back-rest with an oscillating support, which is movable in the vertical direction. It is thus possible to expose primarily the skin of the back to a vibrating movement, which may provide a pleasant sensation. On the other hand, the deeper-lying muscle groups in the back remain essentially unaffected. Tiredness and cramp in the muscles cannot therefore be remedied using the arrangement described.

The present invention relates to an arrangement which has as its object to remedy the discomfort experienced upon lengthy periods of sitting in a seat, by means of massaging certain specific muscle groups in the back. A further object of the invention is that it should have a simple construction and be inexpensive to produce. In addition, it should have small dimensions so that it can be fitted in conventional seats, for example vehicle seats.

According to the invention these objects are achieved by virtue of the arrangement being designed in. The invention includes two identical pulsators to be accommodated in recesses intended for this purpose in the padding material of the backrest of the seat, on each side of a vertical line of symmetry of the backrest. Each pulsator has a respective electrically operated driving motor. A housing with an open front side, opening toward the front surface of the seat backrest, accommodates a plurality of massage elements which are in the form of flaps supported on vertically oriented rotary shafts. The motors which drive the shafts that rotate the flaps supported thereon are connected to a common electrical control system. During a time limited work cycle, which may last about one minute, the flaps are alternately rotated for a period of time, like 7 seconds, and stopped for an identical period of time. The motor connection to the flap rotating shafts enables the shafts to alternately rotate back and forth, moving the edges of the flaps into and out of the front of the housing. The flaps alternate at a frequency of between 2 and 10 Hz, more particularly 2 and 5 Hz and preferably about 2.6 Hz, when the respective electric motor to the flaps for the housing is operated.

By designing the arrangement in accordance with the invention with two pulsators which are each driven by their respective driving motor, their dimensions are made small and they can therefore be fitted easily in recesses provided for this purpose in the padding material of the back-rest. The positions of the pulsators are thus also fixed, so that they can massage certain pre-determined groups of muscles. Since the massage is intended primarily for these pre-determined groups of muscles, the pulsators can be designed for optimal massage effect. This is achieved, inter alia, with the aid of an electrical control system which controls the drive of the driving motors.

Figure 2:
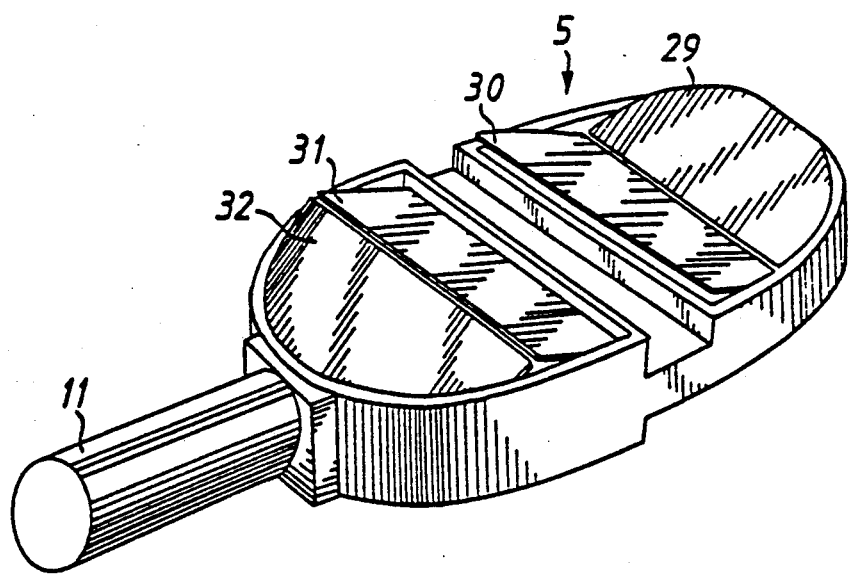
Figure 3:
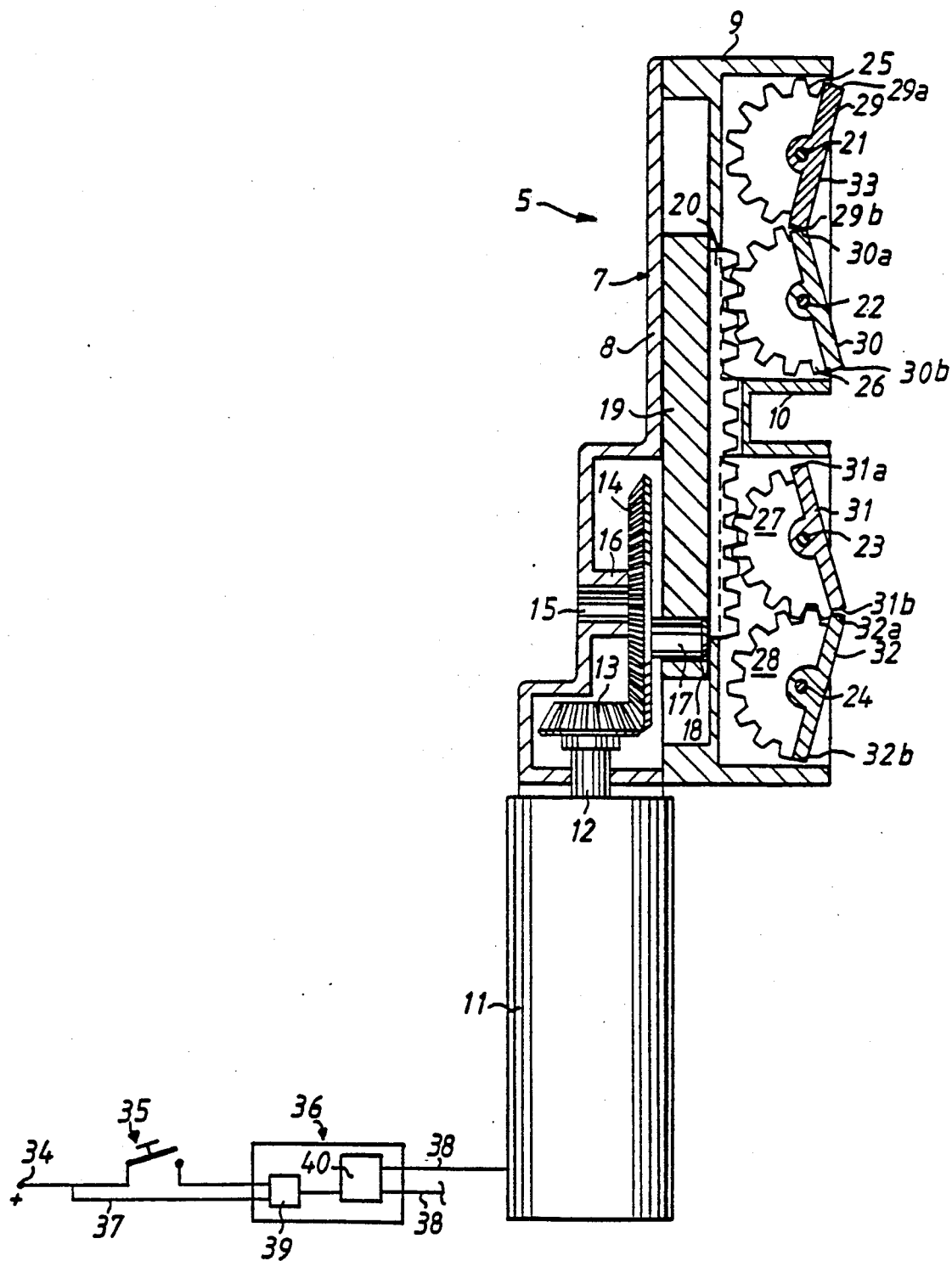

One advantageous embodiment of the invention is described in the following illustrative example, which is given with reference to the attached drawings, in which: FIG. 1 is a general view of a seat with a massage arrangement according to the invention fitted in the back-rest cushion, FIG. 2 is a perspective view of a pulsator incorporated in the massage arrangement, and FIG. 3 is a vertical cross-sectional view of a pulsator.

FIG. 1 shows a general view of a seat 1, for example a vehicle seat. This comprises in a conventional manner a seat cushion 2 and a back-rest 3, both of which are built around a frame which is surrounded by soft padding material and covered with upholstery. The padding material consists of foamed plastic material which, in the back-rest 3, is designed with two cavities 4. Each cavity 4 accommodates, under the upholstery covering, a pulsator 5 according to the invention. Both pulsators 5 are of identical design.

The pulsators 5 are positioned in the back-rest 3 at a height H of about 30 cm calculated from the lower edge of the back-rest 3 to a horizontal center line 6 of the pulsators 5. The lower edge of the back-rest 3 is in this connection assumed to lie at approximately the same height as a seat plane of the seat cushion 2, which seat plane corresponds to the position of the seat cushion 2 when its padding material is compressed by a person sitting in the seat 1. The pulsators 5 extend in the vertical direction by a length L which is about 11 cm. The distance S between the vertical line of symmetry of each respective pulsator and a vertical line of symmetry of the back-rest 3 is chosen at about 8 cm. The breadth B of the pulsators 5 is chosen at about 8 cm. The horizontal center line 6 of the pulsators 5 corresponds, in accordance with these values and in the case of an average-sized individual sitting in the seat 1, to the height of that one of the spinal vertebrae of the individual which in anatomy is called thoracic vertebra T12. The extent of the pulsators 5 in the vertical direction is adapted so that even a number of persons who are taller or shorter than normal can sit in the seat with thoracic vertebra T12 within the vertical height of the pulsators 5.

Five large muscles are gathered and bear on each other in the said position of the pulsators 5. These muscles are:

the longissimus thorax muscle,
the longissimus dorsi muscle,
the longissimus dorsi part,
the inferior posterior serratus muscle and
the longissimus dorsi part.

These muscles are to a large extent responsible for the back being held upright and it is these muscles which become tired under long-term stress.

The design of the pulsators 5 is shown in greater detail in FIGS. 2 and 3. FIG. 2 shows only the principal construction of the pulsator 5 and does not therefore agree in all details with what is shown in FIG. 3 which, in construction terms, is more complete. Since the design of the pulsators 5 is completely identical, only one of the pulsators 5 is described.

The pulsator 5 comprises a housing 7 consisting of a rear part 8 and a front part 9 firmly connected to each other. The front part 9 is designed on its front side with a horizontally transverse recess 10 intended for a strap (not shown), by means of which the pulsator 5 can be strapped firmly to the back-rest 3. Attached to the lower side of the rear part 8 by means of a screw connection (not shown) is an electrical driving motor 11. The output shaft 12 of the driving motor 11 projects through a hole into the housing 7 and is connected inside the housing 7 to a conical gear wheel 13.

The gear wheel 13 forms, together with a crown wheel 14, a bevel gear. The crown wheel 14 is here rotatably mounted on a bearing shaft 15 which is secured firmly to the rear part 8 of the housing 7 in a hub 16 integrated with the latter. The crown wheel 14 bears, on its front side, a driving pin 17 which is eccentrically oriented relative to the bearing shaft 15 of the crown wheel 14. The driving pin 17 engages in a tranverse recess 18 in an essentially rectangular plate 19 which in the vertical direction is displaceably mounted in the housing 7. The front part 9 of the housing 7 is here designed with integrated guides, which localize the plate 19 at its front side at the same time as the rear part localizes the rear side of the plate 19. The edges of the plate 19 are localized in an analogous manner by guides on the sides of the front part (not shown), by which means the plate 19 is prevented from twisting.

The plate 19 is designed, on its front side in the vicinity of its vertical edges but moving free of the guides, with two vertical racks 20. The racks 20 can be designed integral with the plate 19 or, alternatively, can be designed as separate racks 20 which can be fitted to the plate 19.

Secured in the vertical side walls of the housing 7 are four horizontal bearing shafts 21, 22, 23, 24 which, at both their respective ends, bear segment-shaped gear wheels 25, 26, 27, 28. The bearing shafts 21-24 extend horizontally and parallel to each other. Moreover, all the bearing shafts 21-24 lie in the same plane.

The gear wheels 25-28 engage in pairs with each other so that the gear wheels 25, 26 of the two uppermost shafts 21, 22 are in engagement with each other, just as the gear wheels 27, 28 of the two bottom-most shafts 23, 24 are also in engagement with each other. In addition to this, the two middle gear wheels 26, 27 engage with the racks 20 arranged on the plate 19. To each one of the bearing shafts 21-24 there is attached, fixed in terms of rotation, a massage element 29-32 which, at the front, has a flat surface 33. The massage elements 29-32 according to this example consist of flaps. The positions of the bearing shafts 21-24 and thus of the flaps 29-32 relative to each other are coordinated so that, in a middle position of the plate 19 and the racks 20, all the flaps 29-32 assume a position in which the respective flat surfaces 33 of all the flaps 29-32 lie in the same plane.

In a lower position of the plate 19 and the racks 20, which position corresponds to that shown in FIG. 3, the two upper bearing shafts 21, 22 have been turned by means of the racks 20 and gear wheels 25-28 cooperating with each other. In this connection the two upper flaps 29, 30 have been turned so that the edges 29a, 30b, of the flaps 29, 30, directed away from each other project forwards out of the housing 7. The two lower flaps 31, 32 have been turned in a corresponding manner so that the edges 31b, 32a, of the flaps 31, 32, directed towards each other also project forwards out of the housing 7.

In an upper position of the plate 19 the two upper flaps 29, 30 assume a position of rotation which corresponds to the position in which the two lower flaps 31, 32 are situated according to FIG. 3, and the two lower flaps 31, 32 assume the position of rotation in which the upper flaps 29, 30 are situated according to FIG. 3. In this position the edges 29b, 30a, of the upper flaps 29, 30, directed towards each other and the edges 31a, 32b, of the lower flaps 31, 32, directed away from each other project forwards out of the housing.

The motor 11 mentioned at the outset is connected to an electrical voltage source 34, which is shown schematically in FIG. 3. The voltage source 34 is here connected to a circuit breaker 35 of the spring-back type, which circuit breaker is advantageously positioned on the seat 1 in such a way that it can be easily reached by a person sitting in the seat 1. The circuit breaker 35 has a normally open rest position. Upon activation the circuit breaker 35 completes a connection between the voltage source 34 and an electrical control system 36. This control system 36 is also connected directly to the voltage source 34 via a direct line 37. The control system 36 has two outputs 38, which are simultaneously voltage-carrying or non-voltage-carrying. One output 38 is connected to the electric motor 11 of one pulsator 5 and the other output 38 is connected to the electric motor of the other pulsator.

The control system 36 comprises a holding circuit 39 which, after the circuit breaker 35 has been activated, ensures voltage supply to the control system 36 for a specific pre-determined time, which time is designated below as a work cycle. When the activation of the circuit breaker 35 ceases, which is in itself the intention, this voltage supply is ensured via the direct line 37. The control system 36 also comprises an oscillator-controlled time circuit 40 which, during a work cycle, alternately connects the electric motors 11 to the voltage source 34 and interrupts this connection. In an advantageous embodiment the motors 11 are intermittently voltage-carrying for the same length of time as they are non-voltage-carrying during a work cycle. During this work cycle, however, the motors 11 are voltage-carrying and non-voltage-carrying a number of times. If, for example, a work cycle lasts about 1 minute, the motors 11 can be voltage-carrying for a number of 7-second intervals, which are separated by 7-second intervals during which the motors 11 are non-voltage-carrying. The two pulsators 5 work simultaneously, but their mutual movements are otherwise not synchronized in any way.

The function of the pulsator described above is as follows. When the electric motor 11 is supplied with voltage, the output shaft 12 of the electric motor 11 rotates. At the bevel gear 13, 14 the rotation of the motor shaft 12 is converted to a rotating movement of the crown wheel 14 and the driving pin 17 connected thereto. This in turn results in the plate 19 acquiring an upward and downward movement and the racks 20 connected to the plate 19 impart rotation to the two middle gear wheels 26, 27 with alternating rotational directions. The two middle gear wheels 26, 27 effect, by their teeth engaging with the upper and lower gear wheels 25 and 28 respectively, a rotational direction which is opposed to that of the middle gear wheels 26, 27 respectively. The bearing shafts 21-24 connected to the gear wheels 25-28 transfer their respective movements to the flaps 29-32 attached securely to the shafts 21-24.

During the operation of the electric motor 11 the bearing shafts 21-24 thus rotate in alternate directions, while the flaps 29-32 execute tilting movements. The respective edges of the flaps 29-32 are alternately situated outside and inside the housing 7 itself. In the position shown in FIG. 3 the edges 29a, 30b, of the two upper flaps 29, 30 directed away from each other are outside the housing 7, as are the edges 31b, 32a, of the flaps 31, 32, directed towards each other. The said edges 29a, 30b, 31b, 32a exert a pulsating pressure on the back of a person sitting in the seat. Between the pulsator 5 and the back there is of course the upholstery or the like of the back-rest 3, but, since this is relatively thin, it is without significance in this context. The edges 29a, 30b, 31b, 32a are essentially in contact with the back along horizontal contact lines, corresponding to the projecting edges 29a, 30b, 31b, 32a of the flaps 29-32. The contacts along the two edges 31b, 32a directed towards each other are so close to each other that in practice they are sensed as a single contact line.

The contacts along a contact line are effected, as mentioned, as a pulsating pressure with an at first increasing and then decreasing strength as the flaps 29-32 turn. However, when there is contact, it takes place in approximately the same vertical position. On the other hand, the vertical positions of the contact lines alternately vary depending on which of the edges of the flaps 29-32 exerts the contact. The pulsator 5 thus massages the back and the under-lying muscle groups. The pulsator 5 thus simulates a type of massage which masseurs usually exert with the edges of their hands. This generates line contact with pulsating strength and along alternately different lines. This type of massage which affects the muscle groups results in the flow of oxygenated blood through the muscles being stimulated and in lactic acid and similar residual products being transported away from these. This means that cramp in the muscles can be eased and the feeling of tiredness can be remedied.

The massage gives the best effect when it is provided at a certain frequency, and this should preferably be of the same order of magnitude as the frequency of the muscle itself. For those muscle groups which the pulsator 5 is primarily intended to affect, the massage should be given at a relatively low frequency, of the order of magnitude of 2-10 Hz and preferably at a frequency of between 2 and 5 Hz. The massage is advantageously given according to this example at a frequency of 2.6 Hz. The pulsator 5 is therefore dimensioned so that the flaps 29-32 turn at the said frequency. Since in this way the muscle groups directly affected by the pulsators 5 are caused to move, other muscles are also indirectly affected by the first-mentioned muscles. This means that even muscles located at other positions are stimulated by the pulsators 5. When the circuit breaker 35 is connected, a work cycle begins which lasts for a period of time pre-determined by the holding circuit 39, for example about 1 minute. The work cycle is initiated by the flaps 29-32 effecting their tilting movements for 7 seconds, during which they provide massage at a frequency of 2.6 Hz. There then follows a period of rest for 7 seconds, after which the whole process is repeated a number of times. When a work cycle has been completed, the pulsators 5 return to a rest position which lasts until the circuit breaker 35 is again activated.

The pulsators 5 are primarily intended to be arranged in seats 1 in which persons often sit for long periods of time, for example vehicle seats. The intention is that, when the person feels tiredness in the back muscles, he himself can start up the activation of the pulsators 5 in order to thereby receive a massage.

The invention can, within the scope of the following patent claims, be designed other than has been mentioned in the illustrative example. For example, the entire mechanism which generates the massaging movement can be designed differently.

What is claimed is:

1. Back massaging arrangement for the backrest of a seat for massaging the back of a person sitting in the seat, the arrangement comprising:
   two pulsators for being accommodated in and being laterally spaced apart in the backrest, each pulsator comprising:
   a housing located toward the front surface of the backrest; a plurality of massage element each comprised of flaps, and the flaps being at least partly accommodated within the housing;
   a plurality of rotatable shafts in each housing, each flap being rotatably supported on one of the shafts for being rotated by the shafts to massage a back at the front surface of the backrest, the shafts in each housing are arranged parallel and lie generally in the same plane;
   a drive motor connected with the respective shafts in the housing for rotating the shafts for moving the flaps, and the motor being connected to rotate the shafts in the housing together and in alternating directions;
   a common electric control system connected with the drive motors in each housing, the electric control system being operable for periodically supplying power to the drive motors for simultaneously operating the shafts and the massage element flaps in each housing to move; and the control system being operable so that during a working cycle of the pulsator, the massage elements are alternately at rest and then activated.

2. The massage arrangement of claim 1, further comprising a seat including a seat backrest in which the pulsators are accommodated, the backrest having a front surface against which a back rests, the backrest having a vertical line of symmetry and each pulsator being disposed laterally on a respective side of the vertical line of symmetry.

3. The message arrangement of claim 2, wherein the seat backrest has recesses defined therein which open toward the front surface of the backrest, and the recesses are so positioned that the pulsators are accommodated in the recesses for enabling the massage element flaps to act on the front surface of the backrest to massage a back.

4. The massage arrangement of claim 3, wherein the seat backrest includes padding material and the recesses are defined in the padding material.

5. The massage arrangement of claim 1, wherein the two pulsators are identical.

6. The massage of arrangement of claim 1, wherein there is a respective one of the motors for the massage elements in each of the housings, each motor is connected to the common electric control system for controlling the motors to act simultaneously and to be simultaneously deactivated.

7. The massage arrangement of claim 1, wherein each pulsator includes four of the massage element flaps arranged in two parts such that one of the flaps pairs moves relative to the other pair at a phase displacement of one-half cycle.

8. The massage arrangement of claim 1, wherein the massage element flaps are shaped to include edges, and the massage element flaps are movable during activation of the massage element flaps so that the edges thereof alternately extend toward the surface of the backrest and then move away therefrom to provide a massage.

9. The massage arrangement of claim 1, wherein the housing has a front side which is open toward the front surface of the backrest; the massage element flaps being moveable at least partly out of and then back into the open front side of the housing during activation of the massage elements; and the drive motor being operable for moving the massage element flaps out of and back into the open front side of the housing.

10. The massage arrangement of claim 1, wherein the flaps are supported to rotate out of and back into the open front side of the housing.

11. The massage arrangement of claim 1, further comprising means connected between the motor and the shafts in the housing for moving the flaps to move in alternating inward and outward directions while the motor rotates continuously in one drive direction.

12. The massage arrangement of claim 1, wherein each of the flaps is supported on a respective one of the shafts in the housing, and the shafts in the housing are connected for transferring the turning force from one of the shafts to an other shaft in the housing.

13. The massage arrangement of claim 12, comprising two of the flaps in the housing, each of the two flaps has a neighboring edge directed toward the neighboring edge of the other flap, and each flap of the two flaps has an opposite edge directed away from the other flap, and the motor being connected with the shafts for rotating the shafts so that the flaps in the housing rotate together, so that the neighboring edges of the two flaps move together out of the housing while the opposite edges of the two flaps move together into the housing and the opposite edges of the two flaps then move together out of the housing while the neighboring edges of the two flaps move together into the housing, for exerting a pulsating pressure contact against the back of a person resting against the front surface of the backrest.

14. The massage arrangement of claim 13, wherein the flaps are shaped and oriented and the rotary shafts are so oriented that the pulsating pressure of the flaps is applied against the back of a person sitting against the backrest, along the essentially horizontal contact line.

15. The massage arrangement of claim 2, wherein the pulsator and the massage element flaps are so dimensioned and shaped and the motor connected thereto is operated for moving the massage element flaps at a frequency of between 2 and 5 Hz.

16. The massage arrangement of claim 15, wherein the motor operable for causing the flaps to move at a frequency of about 2.6 Hz.

17. The massage arrangement of claim 10, including means in the electric control system for controlling an entire work cycle to last approximately one minute and to have the entire work cycle include operation of the motors for an identical period of time as the motors are not operating.

18. The massage arrangement of claim 1, wherein the electric control system comprises a time circuit which is connected to the motor and is operable, during one work cycle for causing the motors to alternately receive power for a period lasting approximately 7 seconds and to not receive power and be inoperative for a period of approximately 7 seconds.

19. The massage arrangement of claim 13, comprising two pairs of the flaps in each of the housings, and the shafts for moving the flaps in each of the housings operates the flaps at a phase displacement of one half cycle, wherein the neighboring edges of one pair of flaps in one housing are projecting out of the front side of the one housing while the neighboring edges of the other pair of flaps in the other housing are projecting inward from the front side of the other housing.

20. A seat comprising a seat and backrest part, and the backrest part including recesses defined therein for accommodating pulsators according to claim 1, the back rest having recesses for the pulsators so located that the pulsators are located in the vertical and side positions in such a way that each pulsator covers at least a respective point situated at a height of 30 cm from the lower edge of the backrest and at a respective side position of 8 cm on each side from the vertical line of symmetry of the backrest.

21. The massage arrangement of claim 1, further comprising the drive motors being operable to cause the massage element flaps to move at a frequency of between 2 and 10 Hz when the motors are activated for moving the massage elements for acting on the front surface of the backrest to massage a back resting against the backrest.

* * * * *